US010776411B2

(12) United States Patent
Dechu et al.

(10) Patent No.: US 10,776,411 B2
(45) Date of Patent: Sep. 15, 2020

(54) SYSTEMATIC BROWSING OF AUTOMATED CONVERSATION EXCHANGE PROGRAM KNOWLEDGE BASES

(71) Applicant: International Business Machines Corporation, Armonk, NY (US)

(72) Inventors: Sampath Dechu, Bangalore (IN); Pratyush Kumar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/805,342

(22) Filed: Nov. 7, 2017

(65) Prior Publication Data

US 2019/0138646 A1  May 9, 2019

(51) Int. Cl.
| | |
|---|---|
| *G06F 16/33* | (2019.01) |
| *H04L 12/58* | (2006.01) |
| *G06F 16/332* | (2019.01) |
| *G06F 16/951* | (2019.01) |

(52) U.S. Cl.
CPC ...... *G06F 16/3334* (2019.01); *G06F 16/3326* (2019.01); *G06F 16/3329* (2019.01); *G06F 16/951* (2019.01); *H04L 51/02* (2013.01)

(58) Field of Classification Search
CPC .......................... G06F 16/3334; G06F 16/3326
See application file for complete search history.

(56) References Cited

U.S. PATENT DOCUMENTS

| | | | |
|---|---|---|---|
| 6,925,453 B1 * | 8/2005 | Bergman | G06N 5/022 |
| | | | 706/20 |
| 8,700,624 B1 * | 4/2014 | Pragada | G06F 16/951 |
| | | | 707/736 |
| 9,213,940 B2 | 12/2015 | Beilby et al. | |
| 2004/0167875 A1 * | 8/2004 | Sneiders | G06F 16/24522 |

(Continued)

OTHER PUBLICATIONS

Wikipedia, Selenium, https://en.wikipedia.org/w/index.php?title=Selenium_(software)&oldid=808357216, Nov. 2, 2017.

(Continued)

*Primary Examiner* — Hosain T Alam
*Assistant Examiner* — Anthony G Gemignani
(74) *Attorney, Agent, or Firm* — Ryan, Mason & Lewis, LLP

(57) ABSTRACT

Methods, systems, and computer program products for systematic browsing of automated conversation exchange program knowledge bases are provided herein. A computer-implemented method includes generating one or more initial questions to be submitted to an automated conversation exchange program; generating one or more natural language variants of the initial questions; submitting the one or more natural language variants of the initial questions to the automated conversation exchange program; identifying one or more valid responses returned by the automated conversation exchange program in response to the submitted natural language variants of the initial questions; deriving one or more items of data from the identified valid responses; storing the derived items of data in an automated conversation exchange program knowledge base; and systemati- (Continued)

cally browsing the automated conversation exchange program knowledge base in connection with one or more application tasks.

20 Claims, 5 Drawing Sheets

(56) References Cited

U.S. PATENT DOCUMENTS

| | | | |
|---|---|---|---|
| 2009/0070311 A1* | 3/2009 | Feng | G06F 16/3329 |
| 2009/0162824 A1* | 6/2009 | Heck | G06N 3/004 |
| | | | 434/322 |
| 2009/0281966 A1 | 11/2009 | Biggs et al. | |
| 2010/0114684 A1 | 5/2010 | Neged | |
| 2011/0252108 A1 | 10/2011 | Morris et al. | |
| 2012/0011015 A1* | 1/2012 | Singh | G06Q 10/10 |
| | | | 705/26.1 |
| 2012/0330934 A1* | 12/2012 | Duboue | G06F 16/334 |
| | | | 707/722 |
| 2014/0006012 A1* | 1/2014 | Zhou | G06F 16/3344 |
| | | | 704/9 |
| 2014/0108583 A1* | 4/2014 | Kulkarni | H04L 51/046 |
| | | | 709/206 |
| 2014/0236934 A1* | 8/2014 | Boyle | G06F 17/289 |
| | | | 707/723 |
| 2017/0310613 A1* | 10/2017 | Lalji | H04L 51/02 |

OTHER PUBLICATIONS

SourceForge, Mechanize, http://wwwsearch.sourceforge.net/mechanize/, Apr. 2010.

Aboluwarin, P., Business of Messaging, Chatbots—Igniting Division of Labour in AI, https://businessofmessaging.com/chatbots-igniting-division-of-labour-in-ai-1430fcc85c8d#.9hmi5yz6j, Apr. 12, 2016.

Maturi, H., LinkedIn, Meta Chatbot: Enabling Collaboration between Chatbots, https://www.linkedin.com/pulse/meta-chatbot-enabling-collaboration-between-chatbots-hareesh-maturi, Dec. 26, 2016.

* cited by examiner

SYSTEMATIC BROWSING OF AUTOMATED CONVERSATION EXCHANGE PROGRAM KNOWLEDGE BASES

FIELD

The present application generally relates to information technology, and, more particularly, to conversational exchange-configured computer program technology.

BACKGROUND

With the availability of less expensive smart phones and mobile Internet, the number of users conversing on messenger platforms has increased in recent years. Additionally, many companies are increasingly utilizing chatbots, automated conversation exchange programs, as another way to interact with users, in addition to mobile applications and webpages.

Additionally, hypertext markup language (HTML) webpages organize information in a structured way, for example, to aid web browsing. Web-crawlers make use of this structured form of HTML pages to extract information from webpages for various applications. However, with the increasing utilization of chatbots, knowledge bases of chatbots are not readily available for current web crawlers to process.

SUMMARY

In one embodiment of the present invention, techniques for systematic browsing of automated conversation exchange program knowledge bases are provided. An exemplary computer-implemented method can include generating one or more initial questions to be submitted to an automated conversation exchange program, generating one or more natural language variants of the initial questions, and submitting the one or more natural language variants of the initial questions to the automated conversation exchange program. The method also includes identifying one or more valid responses returned by the automated conversation exchange program in response to the submitted natural language variants of the initial questions, deriving one or more items of data from the identified valid responses, storing the derived items of data in an automated conversation exchange program knowledge base, and systematically browsing the automated conversation exchange program knowledge base in connection with one or more application tasks.

In another embodiment of the invention, an exemplary computer-implemented method can include generating multiple initial questions to be submitted to an automated conversation exchange program, generating natural language variants of the initial questions, and iteratively submitting the natural language variants of the initial questions to the automated conversation exchange program. The method also includes identifying a first set of one or more valid responses returned by the automated conversation exchange program in response to the submitted natural language variants of the initial questions, identifying one or more entities in the initial questions that correspond to the first set of valid responses, and generating one or more entity variant versions of the initial questions that correspond to the first set of valid responses. Additionally, the method includes iteratively submitting the entity variant versions to the automated conversation exchange program, identifying a second set of one or more valid responses returned by the automated conversation exchange program in response to the submitted entity variant versions, deriving one or more items of data from the second set of valid responses, storing the derived items of data in an automated conversation exchange program knowledge base, and systematically browsing the automated conversation exchange program knowledge base in connection with one or more application tasks.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes systematic browsing (also referred to herein as crawling) of knowledge bases of automated conversation exchange programs (also referred to herein as chatbots). At least one embodiment of the invention can include discovering one or more valid anchor questions based on chat descriptions, domain knowledge, and/or manually entered seed questions. As used herein, a "seed question" refers to a question that begins a conversation with a chat bot, and an "anchor question" refers to a question that produced a valid response from the chatbot. One or more embodiments can also include generating and applying natural language variations of anchor questions for repeatedly conversing with a chatbot. Discovering anchor questions can involve using, for example, explorative and exploitative questions found using an iterator and chatbot metadata.

At least one embodiment of the invention can also include discovering iterator entities in the anchor questions, generating entity variants of the anchor questions with one or more possible values of iterator entities, and iteratively conversing with the chatbots. As used herein, an "iterator entity" refers to an entity type for which various values can be used to ask similar questions. Conversing with the chatbots can include conversing through a programmatic interface, checking the validity of chatbot responses, as well as processing and storing the extracted data from a valid chatbot response in a knowledge base. By way of example, if a chatbot indicates that it does not understand a question or that it does not know the answer to the question, then such an indication would be termed an invalid response to the question. If the chatbot asks a probing follow-up question or answers the question, then such an indication would be termed a valid response.

As detailed herein, one or more embodiments of the invention include implementing iterative knowledge determinations from a chatbot at the backend via an automated program (also referred to herein as a bot), with no human interaction required. The automated program (bot) programmatically and iteratively interacts with a chatbot to determine and process information known and/or learned by the chatbot. Such embodiments can focus on programmatic chatting, iterative questioning, and knowledge storing.

Figure 1:
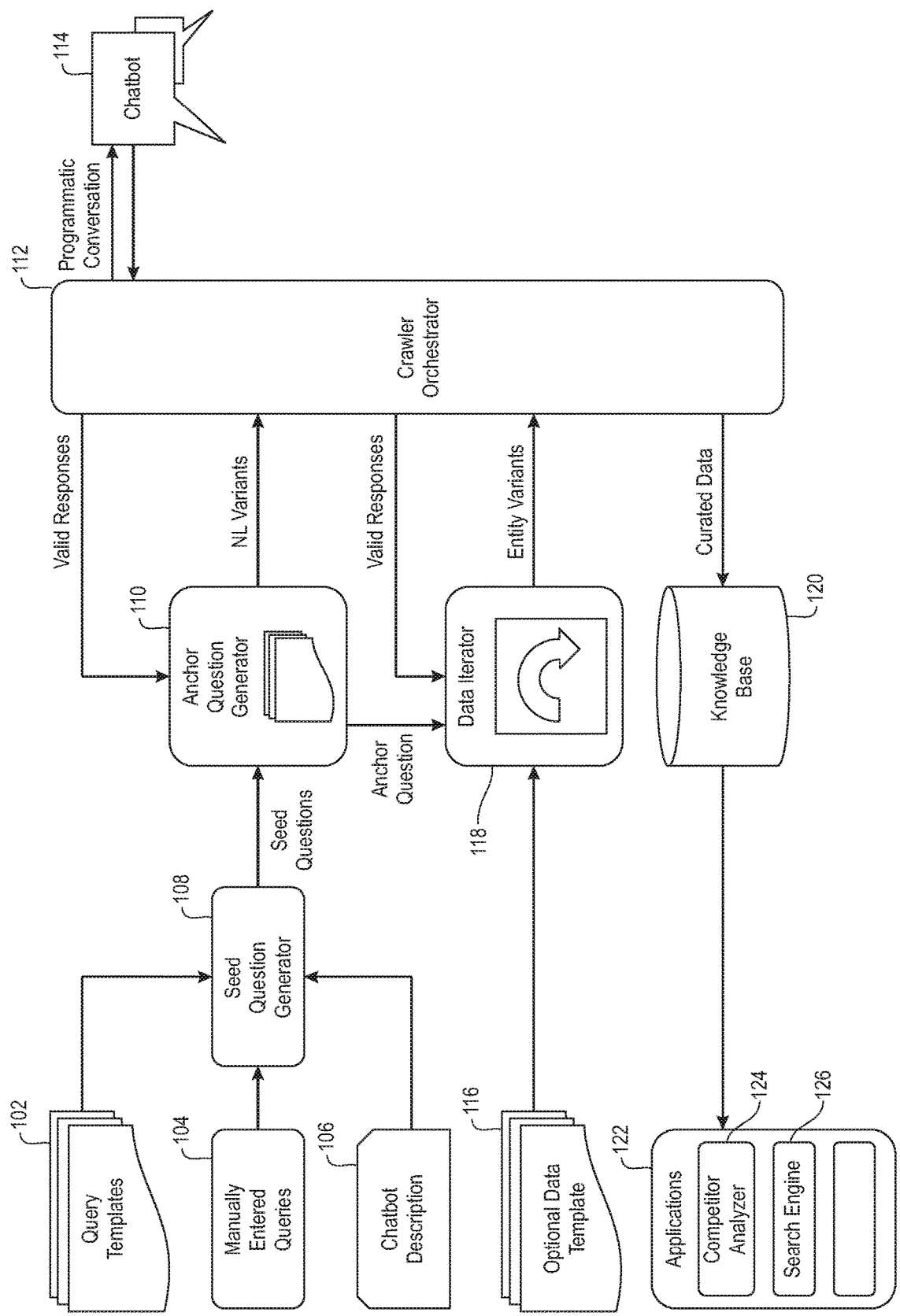
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a seed question generator 108, which generates seed questions from chatbot descriptions 106 (for example, "Show me black running shoes from Company X"), domain knowledge (for example, "Show me products in electronics"), manually entered queries 104 (for example, "Show me smart phone model X, grey, 128 GB"), and/or pre-defined query templates 102. Seed question generator 108 then sends the seed questions to an anchor question generator 110, which generates natural language (NL) variants of the provided seed questions and sends the NL variants to a crawler orchestrator 112.

The crawler orchestrator 112 converses programmatically with a chatbot 114, and receives responses from the chatbot 114 in connection with the questions provided by the crawler orchestrator 112. Also, the crawler orchestrator 112 processes the responses from chatbot 114 and sends valid responses to the anchor question generator 110, which compares the valid responses to the generated anchor questions, and sends the anchor questions corresponding to the valid responses to a data iterator 118, or iterates the above-noted sequence of steps with one or more additional seed questions until a valid response is received from the crawler orchestrator 112.

The data iterator 118 identifies one or more iterator entities in the anchor questions provided by anchor question generator 110, generates one or more entity variant questions, and sends the entity variant questions to the crawler orchestrator 112. The crawler orchestrator 112 then converses programmatically with the chatbot 114 and receives responses to the entity variant questions. The crawler orchestrator 112 processes the responses from the chatbot 114 and sends valid responses back to the data iterator 118. If the data iterator 118 detects more iterator entities in the received responses, the above-noted steps (between the data iterator 118 and the crawler orchestrator 112) can be repeated. As also depicted in FIG. 1, an optional data template 116 can be proposed and/or provided to the data iterator 118 to aid data iteration.

Additionally, the crawler orchestrator 112 can provide data related to valid chatbot 114 responses to a knowledge base 120. An applications component 122 can access the data stored in the knowledge base 120, enabling a search engine application 126, a competitor analytics applications 124, etc.

In one or more embodiments of the invention, the crawler orchestrator 112 can include application programming interface (API) based access if supported by the chatbot 114; else the crawler orchestrator 112 can include programmatic user interface (UI) access.

As noted above in connection with the anchor question generator 110, one or more embodiments of the invention can include generating natural language variants of seed questions. Such variants can be generated, for example, because one or more seed questions may not be recognized by a chatbot, and one or more variants might be recognized by the chatbot instead. In such an embodiment, generating natural language variants of a seed question can include using a lexical database to iteratively refactor the seed question based on one or more rule-sets. Such rule-sets might include, for example, replacing one or more nouns and/or one or more verbs based on similarity in the lexical database, and replacing one or more verbs with one or more generic terms whenever the generic term generates a valid parse tree.

Also, as noted above in connection with the data iterator 118, one or more embodiments of the invention can include iteratively generating entity variants for anchor questions. As detailed herein, once a seed question has been identified, based on a bot response, that seed question becomes an anchor question. A subsequent step can include identifying any entities in the anchor question relevant for iteration, and then identifying variants of those entities based on one or more knowledge bases. Example types of such entities can include time, location, etc.

In some cases, an interaction with a chatbot can result in the need for one or more follow-up questions. By way merely of example, consider an initial question of "What is the price of a shirt from Company X?" A possible follow-up question in such a scenario might include the question of "What size are you looking for?" For such cases, the crawler orchestrator can implement one or more data templates with a set of key-attribute pairs for potential follow-up questions. Continuing with the above shirt example, such attribute pairs might include the following: {"color": "any," and "size": "medium"}. If the chatbot asks such a follow-up question, then the crawler orchestrator can match the entities in the question with the set of keys in the data templates, and then respond back to the chatbot with the corresponding values.

Referring again to FIG. 1, and as detailed above, the crawler orchestrator 112 can implement programmatic conversation with a chatbot 114 through a programmatic interface. If, for example, the chatbot 114 provides representational state transfer (REST) APIs, then the crawler orchestrator 112 uses REST calls to communicate with the chatbot 114 as called by the crawler back-end. If the chatbot interface is a graphical user interface, then the crawler orchestrator 112 can use one or more tools to automate the browser interactions to send and receive responses.

As noted above, the crawler orchestrator 112 can also include the functionality of analyzing the validity of chatbot responses. One or more embodiments of the invention can include training the crawler orchestrator 112 to classify chatbot messages as valid or invalid via use of supervised and/or unsupervised classifiers. By way merely of example, invalid messages might include messages similar to "Can you repeat that," "I don't understand," etc., while valid messages might include affirmative statements such as "The nearest bank is located here," etc.

The crawler orchestrator 112 can also facilitate knowledge searching and processing applications. In one or more embodiments of the invention, all chat logs of the crawler orchestrator 112 can be stored for further processing in the knowledge base 120. Then, based on the collected data, knowledge can be ascertained and/or extracted and stored in structured data stores depending on the specific application in question (such as applications 124 and 126 in FIG. 1).

Further, in one or more embodiments of the invention, the automation provided by the crawler can be supported and/or supplemented by human interaction, which can be specifically programmed into the orchestrator 112. For example, such interaction can include providing guidance on the choice of seed question(s) and/or the choice of natural language variants.

Figure 2:
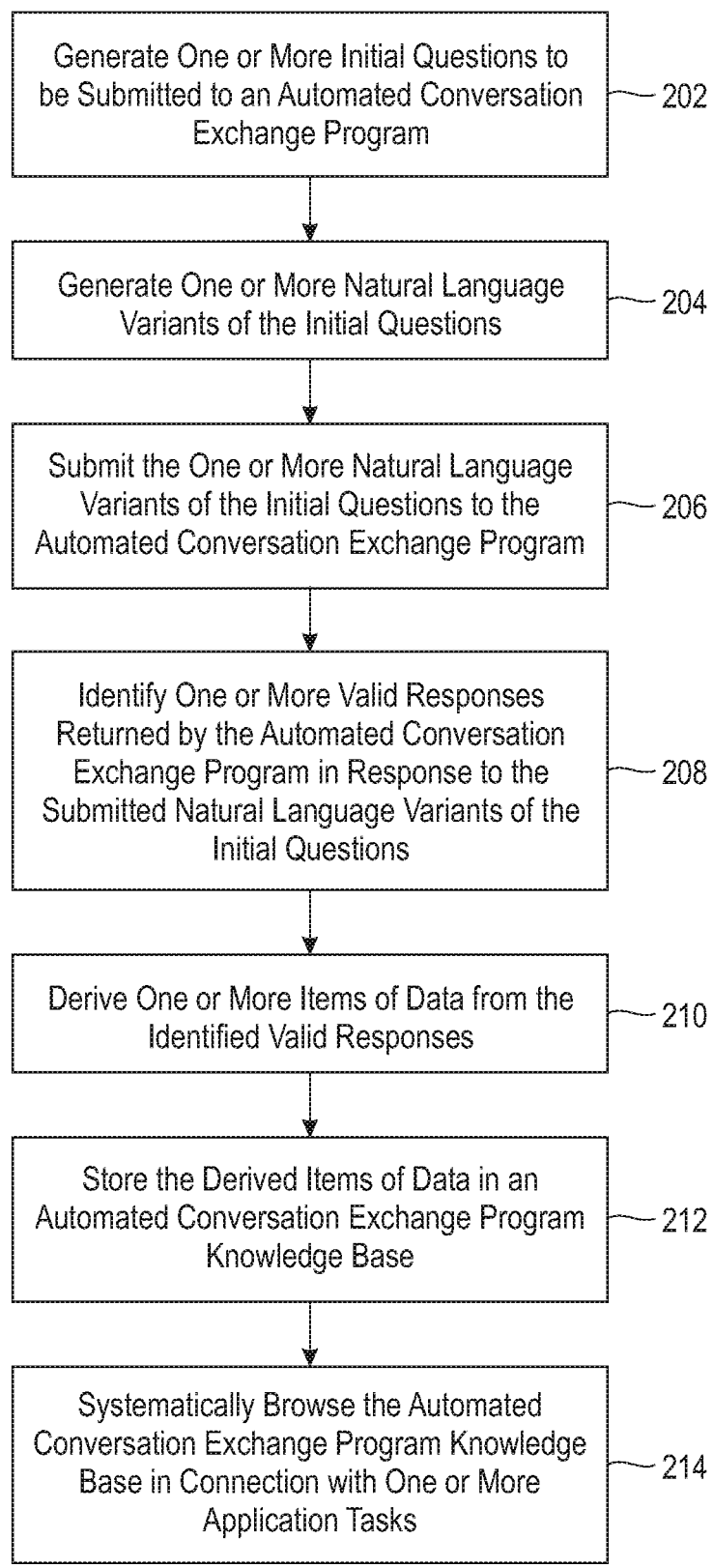
FIG. 2 is a flow diagram illustrating techniques according to an embodiment of the invention.

FIG. 2 is a flow diagram illustrating techniques according to an embodiment of the present invention. Step 202 includes generating one or more initial questions to be submitted to an automated conversation exchange program. Generating the initial questions can include generating the initial questions based on one or more manually entered questions, one or more descriptions of the automated exchange program, domain knowledge, and/or one or more pre-defined question templates.

Step 204 includes generating one or more natural language variants of the initial questions. Step 206 includes submitting the one or more natural language variants of the initial questions to the automated conversation exchange program. Submitting the natural language variants of the initial questions to the automated conversation exchange program can include conversing with the automated conversation exchange program through a programmatic interface.

Step 208 includes identifying one or more valid responses returned by the automated conversation exchange program in response to the submitted natural language variants of the initial questions. Identifying the valid responses can include using one or more supervised classifiers and one or more unsupervised classifiers.

Step 210 includes deriving one or more items of data from the identified valid responses. Step 212 includes storing the derived items of data in an automated conversation exchange program knowledge base.

Step 214 includes systematically browsing the automated conversation exchange program knowledge base in connection with one or more application tasks. The application tasks can include one or more search tasks, one or more analytics tasks, and/or one or more electronic commerce tasks.

The techniques depicted in FIG. 2 can also include matching one or more entities in a follow-up question provided by the automated conversation exchange program with one or more values in one or more pre-determined data templates, and submitting, to the automated conversation exchange program, the one or more values.

Also, an additional embodiment of the invention includes generating multiple initial questions to be submitted to an automated conversation exchange program, generating natural language variants of the initial questions, and iteratively submitting the natural language variants of the initial questions to the automated conversation exchange program. Such an embodiment can also include identifying a first set of one or more valid responses returned by the automated conversation exchange program in response to the submitted natural language variants of the initial questions, identifying one or more entities in the initial questions that correspond to the first set of valid responses, and generating one or more entity variant versions of the initial questions that correspond to the first set of valid responses. The entities can include, for example, one or more time entities and/or one or more location entities. Additionally, such an embodiment can include iteratively submitting the entity variant versions to the automated conversation exchange program, identifying a second set of one or more valid responses returned by the automated conversation exchange program in response to the submitted entity variant versions, deriving one or more items of data from the second set of valid responses, storing the derived items of data in an automated conversation exchange program knowledge base, and systematically browsing the automated conversation exchange program knowledge base in connection with one or more application tasks.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives seed question information sent from a data source to the transmission server. The server can process the information, for example, based upon user-provided user preference information that is stored in memory on the server. Subsequently, an alert is generated containing chat-bot response information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
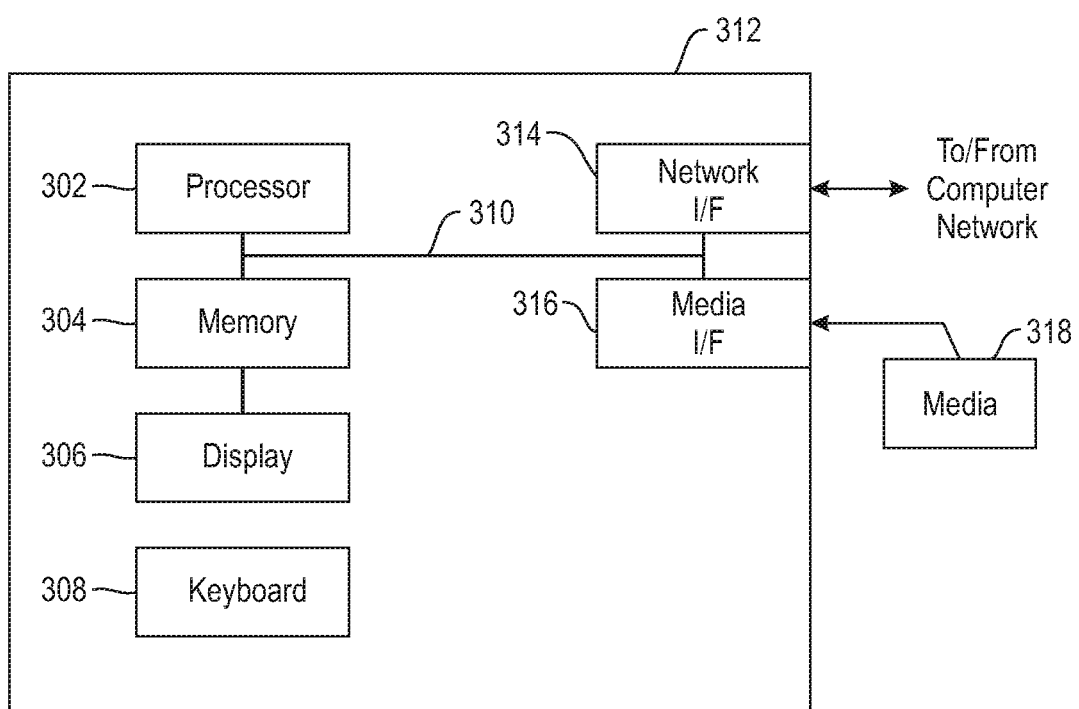
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
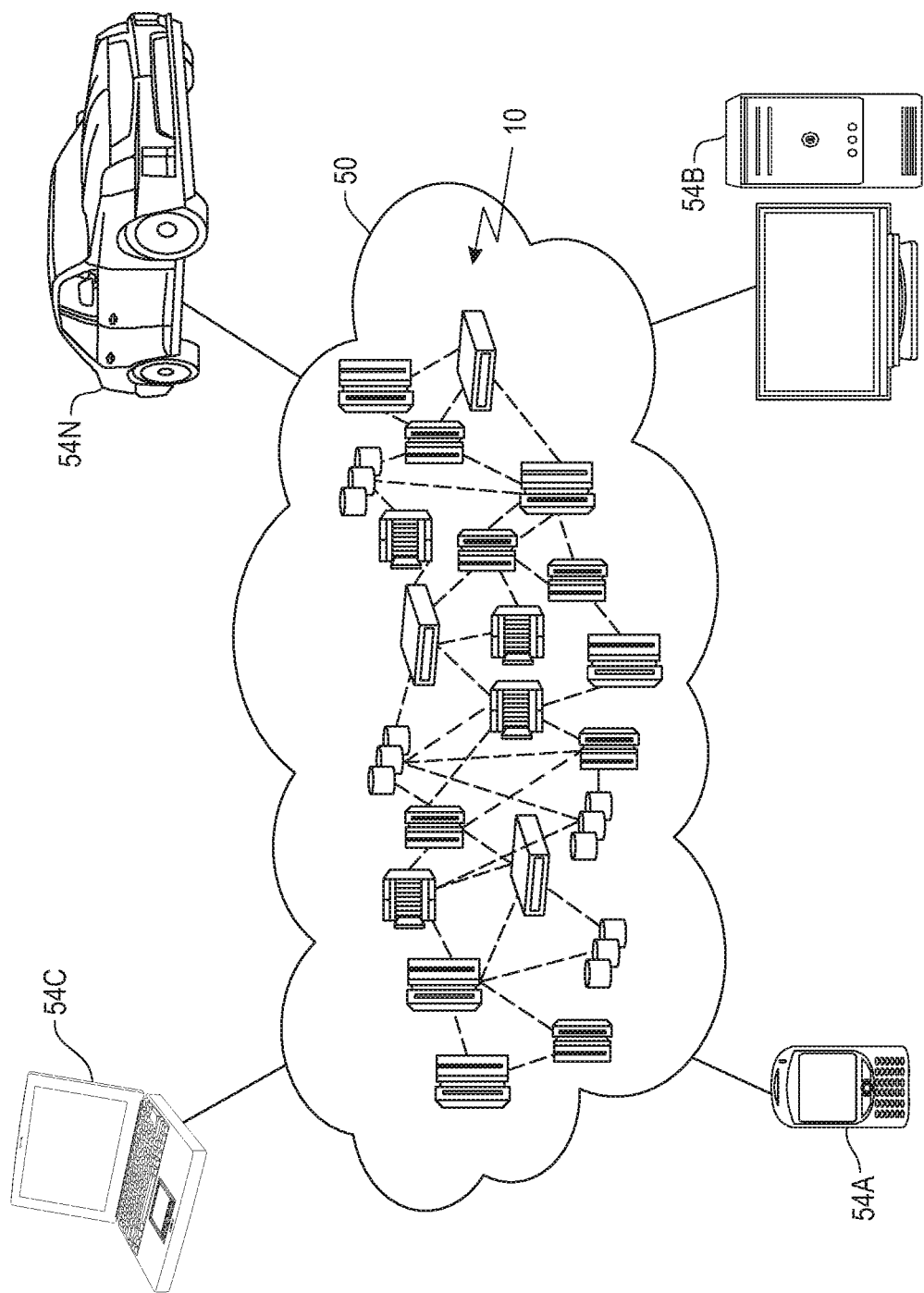
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
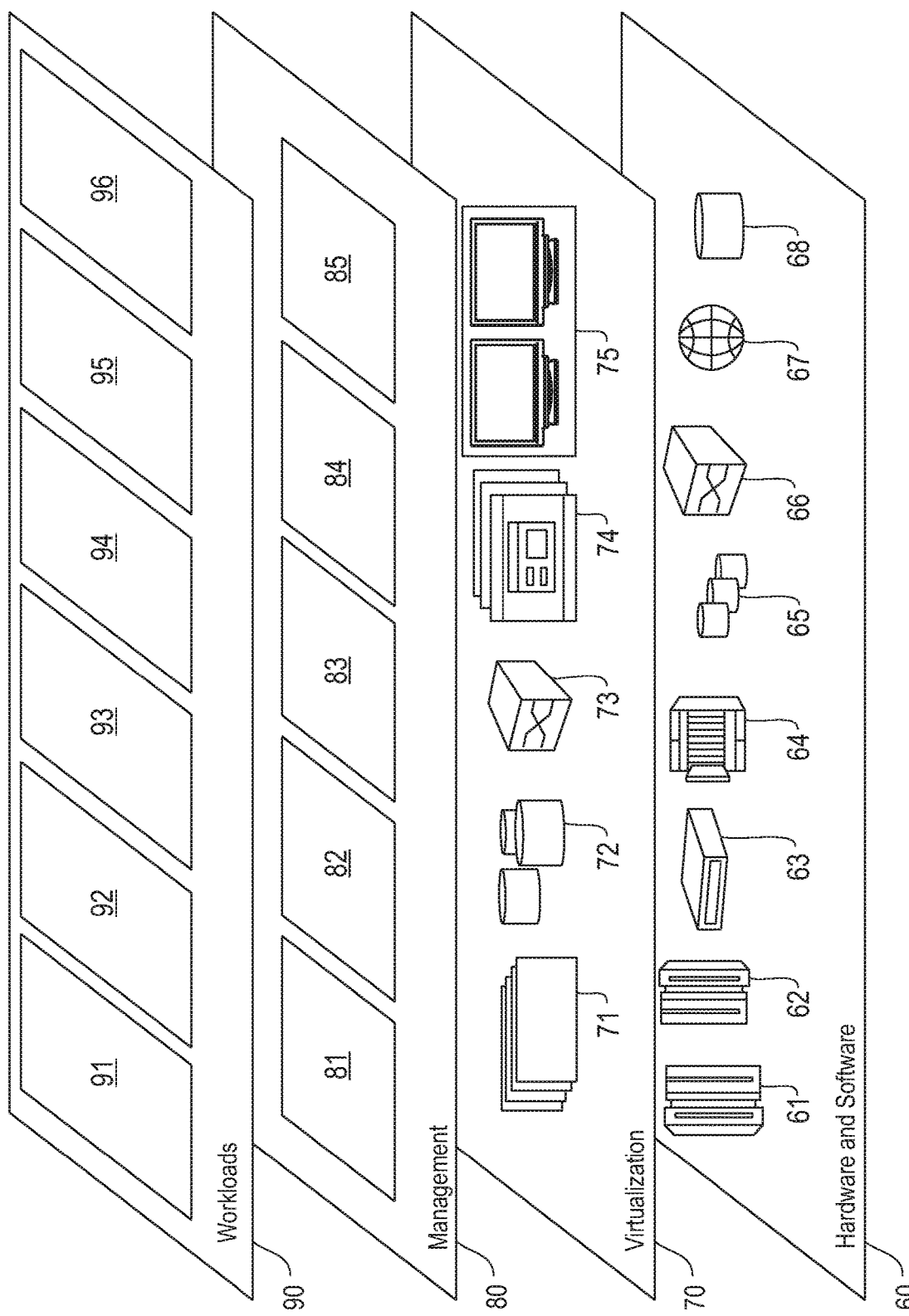
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and systematic browsing of automated conversation exchange program knowledge bases 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automated crawling of chatbot knowledge bases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for extracting information from an automated conversation exchange program knowledge base, the method comprising:
    automatically generating one or more initial questions to be submitted to an automated conversation exchange program;
    generating one or more natural language variants of the initial questions, wherein said generating the one or more natural language variants comprises using a lexical database to iteratively refactor the one or more initial questions based at least in part on one or more rule-sets;
    submitting the one or more natural language variants of the initial questions to the automated conversation exchange program;
    identifying one or more valid responses returned by the automated conversation exchange program in response to the submitted natural language variants of the initial questions;
    deriving one or more items of data from the identified valid responses;
    storing the derived items of data in an automated conversation exchange program knowledge base;
    systematically browsing the automated conversation exchange program knowledge base in connection with one or more application tasks; and
    extracting at least a portion of the stored items of data from the automated conversation exchange program knowledge base in connection with performing at least one of the one or more application tasks;
    wherein the method is carried out by at least one computing device.

2. The computer-implemented method of claim 1, wherein said generating the initial questions comprises generating the initial questions based on one or more manually entered questions.

3. The computer-implemented method of claim 1, wherein said generating the initial questions comprises generating the initial questions based on one or more descriptions of the automated exchange program.

4. The computer-implemented method of claim 1, wherein said generating the initial questions comprises generating the initial questions based on domain knowledge.

5. The computer-implemented method of claim 1, wherein said generating the initial questions comprises generating the initial questions based on one or more predefined question templates.

6. The computer-implemented method of claim 1, wherein said submitting the natural language variants of the initial questions to the automated conversation exchange program comprises conversing with the automated conversation exchange program through a programmatic interface.

7. The computer-implemented method of claim 1, wherein said identifying the valid responses comprises using one or more supervised classifiers and one or more unsupervised classifiers.

8. The computer-implemented method of claim 1, wherein the one or more application tasks comprises one or more search tasks.

9. The computer-implemented method of claim 1, wherein the one or more application tasks comprises one or more analytics tasks.

10. The computer-implemented method of claim 1, wherein the one or more application tasks comprises one or more electronic commerce tasks.

11. The computer-implemented method of claim 1, comprising:
    matching one or more entities in a follow-up question provided by the automated conversation exchange program with one or more values in one or more predetermined data templates.

12. The computer-implemented method of claim 11, comprising:
    submitting, to the automated conversation exchange program, the one or more values.

13. A computer program product comprising a computer readable storage medium having program instructions embodied therewith, the program instructions executable by a computing device to cause the computing device to:
    automatically generate one or more initial questions to be submitted to an automated conversation exchange program;
    generate one or more natural language variants of the initial questions, wherein said generating the one or more natural language variants comprises using a lexical database to iteratively refactor the one or more initial questions based at least in part on one or more rule-sets;
    submit the one or more natural language variants of the initial questions to the automated conversation exchange program;
    identify one or more valid responses returned by the automated conversation exchange program in response to the submitted natural language variants of the initial questions;
    derive one or more items of data from the identified valid responses;
    store the derived items of data in an automated conversation exchange program knowledge base;
    systematically browse the automated conversation exchange program knowledge base in connection with one or more application tasks; and
    extract at least a portion of the stored items of data from the automated conversation exchange program knowledge base in connection with performing at least one of the one or more application tasks.

14. A system comprising:
    a memory; and
    at least one processor operably coupled to the memory and configured for:

automatically generating one or more initial questions to be submitted to an automated conversation exchange program;

generating one or more natural language variants of the initial questions, wherein said generating the one or more natural language variants comprises using a lexical database to iteratively refactor the one or more initial questions based at least in part on one or more rule-sets;

submitting the one or more natural language variants of the initial questions to the automated conversation exchange program;

identifying one or more valid responses returned by the automated conversation exchange program in response to the submitted natural language variants of the initial questions;

deriving one or more items of data from the identified valid responses;

storing the derived items of data in an automated conversation exchange program knowledge base;

systematically browsing the automated conversation exchange program knowledge base in connection with one or more application tasks; and extracting at least a portion of the stored items of data from the automated conversation exchange program knowledge base in connection with performing at least one of the one or more application tasks.

15. A computer-implemented method for extracting information from deep web knowledge bases, the method comprising:

automatically generating multiple initial questions to be submitted to an automated conversation exchange program;

generating natural language variants of the initial questions, wherein said generating the natural language variants comprises using a lexical database to iteratively refactor the initial questions based at least in part on one or more rule-sets;

iteratively submitting the natural language variants of the initial questions to the automated conversation exchange program;

identifying a first set of one or more valid responses returned by the automated conversation exchange program in response to the submitted natural language variants of the initial questions;

identifying one or more entities in the initial questions that correspond to the first set of valid responses;

generating one or more entity variant versions of the initial questions that correspond to the first set of valid responses;

iteratively submitting the entity variant versions to the automated conversation exchange program;

identifying a second set of one or more valid responses returned by the automated conversation exchange program in response to the submitted entity variant versions;

deriving one or more items of data from the second set of valid responses;

storing the derived items of data in an automated conversation exchange program knowledge base;

systematically browsing the automated conversation exchange program knowledge base in connection with one or more application tasks; and extracting at least a portion of the stored items of data from the automated conversation exchange program knowledge base in connection with performing at least one of the one or more application tasks;

wherein the method is carried out by at least one computing device.

16. The computer-implemented method of claim 15, wherein the one or more entities comprise one or more time entities.

17. The computer-implemented method of claim 15, wherein the one or more entities comprise one or more location entities.

18. The computer-implemented method of claim 15, wherein said generating the initial questions comprises generating the initial questions based on at least one of one or more manually entered questions, one or more descriptions of the automated exchange program, domain knowledge, and one or more pre-defined question templates.

19. The computer-implemented method of claim 15, wherein said identifying the first set of one or more valid responses and identifying the second set of valid responses comprises using one or more supervised classifiers and one or more unsupervised classifiers.

20. The computer-implemented method of claim 15, wherein the one or more application tasks comprises at least one of one or more search tasks, one or more analytics tasks, and one or more electronic commerce tasks.

* * * * *